(12) United States Patent
Xiong

(10) Patent No.: US 6,416,810 B1
(45) Date of Patent: Jul. 9, 2002

(54) METHOD FOR PREPARING LEAF PROTEINS WITH RUMEX L. AND OBTAINED PRODUCT THEREBY

(76) Inventor: Jungong Xiong, 8F, No. 110, Youhaonan Road, Urumqi, Xinjiang, 830000 (CN)

( * ) Notice: Subject to any disclaimer, the term of this patent is extended or adjusted under 35 U.S.C. 154(b) by 0 days.

(21) Appl. No.: 09/700,010

(22) PCT Filed: Dec. 30, 1998

(86) PCT No.: PCT/CN98/00319

§ 371 (c)(1),
(2), (4) Date: Jan. 8, 2001

(87) PCT Pub. No.: WO99/57991

PCT Pub. Date: Nov. 18, 1999

(30) Foreign Application Priority Data

May 12, 1998 (CN) ........................................ 98101850 A

(51) Int. Cl.[7] .............................. A23J 1/00; A23K 1/12; A23K 1/14
(52) U.S. Cl. .................... 426/636; 426/656; 426/807
(58) Field of Search ................................ 426/636, 656, 426/807

(56) References Cited

FOREIGN PATENT DOCUMENTS

| CN | 1136389 | * | 11/1996 |
|---|---|---|---|
| JP | 62114999 | * | 5/1987 |
| JP | 62115248 | * | 5/1987 |
| JP | 62278951 | * | 12/1987 |
| JP | 04053416 | * | 2/1992 |

OTHER PUBLICATIONS

Ladeji et al, Food Chem., vol. 48(2), p. 205–6, 1993.*

Choromanska, Wiadomosci Instytutu Melioracji, vol. 16(2), p. 73–91, 1989.*

* cited by examiner

Primary Examiner—Chhaya D. Sayala
(74) Attorney, Agent, or Firm—Fulbright & Jaworski L.L.P.

(57) ABSTRACT

There is provided a method for preparing leaf proteins with *Rumex Acetosa L.* and obtained product thereby. After Rumex L. was washed, squeezed, the juice was heated to 70–90° C., the proteins were precipitated, the supernatants were removed, Rumex L. leaf protein products were obtained. The byproducts (supernatants) can be used to soak straws to enhance nutritive ingredients and palatability. Grass residue can be used as grass powders, grass pellets or grass bricks. The obtained leaf proteins enriched in proteins and various amino acids, vitamins and iron, magnesium, zinc, calcium and organic germanium, it can be used as protein feed, also it can be used to improve people's dietary structure.

6 Claims, No Drawings

METHOD FOR PREPARING LEAF PROTEINS WITH RUMEX L. AND OBTAINED PRODUCT THEREBY

FIELD OF THE INVENTION

This invention relates to a method of preparing leaf protein, especially a method of preparing leaf protein with Hybrid *Rumex Acetosa L.* and the product prepared thereby

BACKGROUND OF THE INVENTION

The grass forage is insufficient, especially those kinds of forage containing high protein level. It is a significant obstacle in respect of developing livestock industry. In the past, all of us considered alfalfa as a high yield species. However, we found that the amount of protein in alfalfa cannot meet our requirements.

Hybrid *Rumex Acetosa L.* is a new plant species, examined and certified by State Committee for Examination & Determination of Grass Species. It was issued a certificate of new grass species under Registration No. 183. Hybrid *Rumex Acetosa L.* belongs to *Knotweed Acetosa*, and is a perennial herbaceous herb. Its female parent is *Rumex patienia L.*, and the male one is *Rumex tianschanica L.*

Hybrid *Rumex Acetosa L.* is a high yield, high protein, green juicy forage crop. The protein content is high. The crude protein at the stage of leaves is as high as 30–34%, and 28–29% at the stage of buds. It can not only promote development of farming of cows and pigs, poultry and fishery, but it can also promote and push forward industrialization of livestock industry and development of economy. That is because people have in mind the situation, that supply of leaf protein, grass powder and pellets cannot meet demands both in domestic and international markets, aid they will carry on the development of in-depth processing of Hybrid *Rumex Acetosa L.*

During the first year, Hybrid *Rumex Acetosa L.* does not put forth stemming, and is under a condition of just having leaves. Thus, at this stage, the nutrition value of the forage grass is very high: the content of crude protein is 30–34%. In the second year, it puts forth stemming, blossoms and bears fruits. Usually, it is cut at the stage of budding. The regenerative grass is also cut at the stage of budding; at this period of time the content of crude protein is 27.07–29.94%. The yield is high, too: the yield of Hybrid *Rumex Acetosa L.* is 1300 kg dry grass/0.0667 hectare, and the crude protein represents 28%, while those of violet alfalfa are 1000 kg /0.0667 hectare and 18% only. That is, we have 364 kg of protein/0.0667 hectare for Hybrid *Rumex Acetosa L.*, which is 2.02 times 180 kg for violet alfalfa.

The livestock industry cannot exist without high protein forage, while mankind requires high protein food and drinks, too. At present, additives either in our food or in our drinks have properties of chemical synthesis, and even more, some of them contain properties of gene synthesis. Along with improvements of people's living and nutritious standards, green products, having highly nutritious ingredients of high protein, vitamins and carotene, for sure will be liked by massive people.

Therefore, an object of this invention is to provide a method for preparing leaf protein with Hybrid *Rumex Acetosa L.*

Another object of this invention is to provide the product prepared by the method.

DESCRIPTION OF THE INVENTION

In order to achieve the above-mentioned objects, according to the application there is provided a method for preparing leaf protein, wherein Hybrid *Rumex Acetosa L.* is washed and squeezed, the obtained juice is heated to 70–90° C., and cotton-like protein precipitate occurs. Supernatants arc removed, and paste-like Hybrid *Rumex Acetosa L.* leaf protein product is obtained.

The process of heating the juice as mentioned above can be replaced by adding acid into the squeezed juice. That is, cotton-like protein precipitate can also be obtained by adding acid into the squeezed juice. After supernatants are removed, paste-like Hybrid *Rumex Acetosa L.* protein product is obtained. The said acid can be citric acid or fruit acid.

The production method of this invention can further comprise the steps of preparing Rumex leaf protein in form of pellets or powder by drying the paste-like Rumex leaf protein.

The Rumex supernatants can be used to soak straws of agricultural crops, effectively increasing nutritious ingredients of straws, and improving palatability for animals as a new resource of new forage.

The method of this invention can further comprise the steps of preparing grass powder, grass pellets and grass bricks by drying, crushing, or pressing the byproduct, obtained as straw residue after squeezing the Hybrid *Rumex Acetosa L.* leaves.

It can be known that, the above mentioned leaf protein, which is a protein extracted from an entire plant, is called plant protein. It does not contain any oil substances, so it is a substitute of animal forage.

Leaf protein, obtained from Hybrid *Rumex AceTosa L.*, is a highly value-added protein forage. According to information available, insufficient supply of protein forage is a common issue worldwide, and it is especially prominent in China, It is reported that the production of protein forage will be 2000 tons less than what is demanded in 2000. Especially in China, the production of grass powder is still at its beginning stage The production of green forage is 100 million tons less than what is demanded in China, while South Korea, Japan, Singapore, Hong Kong, Taiwan and other countries and regions all import green forage (grass powder, grass bricks, grass pellets) more than 300 tons every year. Therefore, it makes significant economic and social sense to produce green forage rich in protein, and to produce its byproducts (grass powder and grass pellets) with Hybrid *Rumex Acetosa L.*

In addition, the leaf protein, obtained from Hybrid *Rumex Acetosa L.*, can not only be used as highly value-added protein forage, but also as a nutritious and health-care product for mankind to improve diet structure of Chinese people.

The leaf protein, obtained from Hybrid *Rumex Acetosa L.*, contains various amino acids, and the kinds of amino acids are rather complete. If amino acids for synthesizing protein are not enough in human body, the content of protein in blood will be low, resulting in anaemia. Hybrid *Rumex Acetosa L.* provides the human body with relatively balanced amino acids (see table 2), especially it contains much lysine, which can supplement insufficient provision of amino acids just with cereal products

TABLE 2

| Essential amino acids | Content mg/ 100 g | Required amount for kids younger 1 year old | Required amount for kids elder than 1 year old | Required amount for kids between 10–12 years old | Required amount for adults elder than 18 years old |
| --- | --- | --- | --- | --- | --- |
| Tryptophane | 35 | 17 | 12.5 | 4 | 3.5 |
| Isoleucine | 73 | 70 | 31 | 30 | 10 |
| Leucine | 133 | 161 | 73 | 45 | 14 |
| Lysine | 97 | 108 | 64 | 60 | 12 |
| Methionine (+cystine) | 45 | 58 | 27 | 27 | 13 |
| Phenyl-alanine (+tyrosine) | 174 | 125 | 69 | 27 | 14 |
| Threonine | 95 | 87 | 37 | 35 | 7 |
| Valine | 100 | 93 | 38 | 33 | 10 |
| Histidine | 49 | 28 | | | |
| Total | 801 | 714 | 352 | 261 | 84 |

The leaf protein, obtained from Hybrid *Rumex Acetosa L.*, also contains a variety of vitamins and lutein, as well as other nutritious elements like iron, magnesium, calcium, zinc, etc. There is no cholesterol like that contained in animal food. (See table 3). It can be used to improve people's diet structure. At present, there have been many specialists in the field of nutrition and food considering that the plant protein should be listed as an important source of nutrition.

TABLE 3

| Ingredient | Crude protein | VA | Folic acid | VE | Fe | Ca | Mg | Mo | Zn |
| --- | --- | --- | --- | --- | --- | --- | --- | --- | --- |
| Leaf protein | 51 | 55 | 0.3 | 30 | 80 | 140 | 118 | 0.78 | 1.26 |
| Beef | 17 | 0.02 | 0.02 | 0.3 | 3 | 10 | 20 | 0.05 | 1.5 |
| Chicken | 21 | — | — | — | 1 | 14 | 19 | 0.35 | — |
| Cod | 17 | — | — | — | 0.9 | 45 | 30 | 0.1 | 0.74 |
| millet | 11 | — | — | 1.2 | 4 | 30 | 167 | 0.3 | 1.7 |
| Rice | 8 | — | — | — | 1 | 50 | 106 | 0.4 | 0.4 |
| Dry kidney bean | 19 | — | 0.05 | — | 6.7 | 137 | 150 | 0.9 | 5.2 |
| Flour | 9.5 | — | — | 1 | 1.2 | 16 | 20 | 0.2 | 1.7 |
| Whole milk | 3.5 | 0.03 | — | 0.1 | 0.1 | 130 | 14 | 0.07 | 0.75 |
| Cheese | 3.5 | — | — | — | 0.3 | 174 | 14 | 0.1 | 0.9 |
| Egg | 14 | 0.3 | — | — | 2.8 | 55 | 11 | 0.16 | 1.5 |
| Spinach | 2.3 | 3 | 0.9 | — | 4 | 81 | 50 | 0.9 | 5.2 |

The leaf protein, obtained from Hybrid *Rumex Acetosa L.*, also contains a lot of organo-selenium. Organo-selenium is praised by medical circle worldwide as "Life element of $21^{st}$ century", because it has excellent effect in preventing cancer. Even more is that there are very few organo-selenium resources, from which the human body can absorb selenium directly, so it is said the element is more precious than gold and diamond.

According to the application, the method for preparing leaf protein with Hybrid *Rumex Acetosa L.* is scientific and reasonable, simple, easy to implement. The obtained product has a color of dark green with fragrant smell. There are no fermenting, moulding, and no bad odor. It can be use as highly value-added protein forage to solve the problem that China seriously lacks protein forage. It can also be used as purely natural green food. It can significantly improve the level of haemochrome in human body, and increase iron, calcium, and magnesium contents in blood. Symptoms of lack of nutrition can be eliminated. Long term drinking or eating food supplemented with leaf protein have good effect for pregnant women, old people, patients of anaemia, especially for kids' development and health.

The following is a further description of this invention with reference to the examples.

BEST MODE FOR CARRYING ON THIS INVENTION

EXAMPLE 1

A Method for Preparing Leaf Protein Product with Hybrid *Rumex Acetosa L.*

The Hybrid *Rumex Acetosa L.* is washed, crushed and squeezed, resulting in obtaining squeezed juice. At 80° C., violet precipitate can be obtained Paste-like, dark green leaf protein can be obtained after removing the supernatants.

It can be dried further to obtain dark green leaf protein products in form of pellet or powder.

Collect the removed supernatants.

After the juice is taken away, drying, crushing, and pressing the remaining Hybrid *Rumex Acetosa L.* result in green forage Rumex grass powder, pellets, or bricks.

EXAMPLE 2

A Method to Produce Leaf Protein Product with Hybrid *Rumex Acetosa L.*

The *Hybrid Rumex Acetosa L.* is washed, crushed and squeezed, resulting in obtaining squeezed juice. Purple floccular precipitate can be obtained by adding citric acid into the juice. Supernatants are removed, and then paste-like, dark green leaf protein is obtained.

INDUSTRIAL APPLICATIONS

According to the invention, the method for preparing leaf protein with Hybrid *Rumex Acetosa L.* and forage with the byproduct supernatants and grass residue can be used for industrial production

What is claimed is:

1. A leaf protein of hybrid *Rumex Acetosa L.* obtained by the method comprising the steps of
   washing, crushing and squeezing the hybrid *Rumex Acetosa L.* to obtain a juice;
   heating the resulting squeezed juice to 70–80° C. to form floccular precipitate; and
   removing supernatants to obtain the leaf protein, wherein the female parent of the hybrid *Rumex Acetosa L.* is *Rumex patienia L.*, and its male parent is *Rumex tianschanica L.*

2. A leaf protein of hybrid *Rumex Acetosa L.* obtained by the method comprising the steps of:
   washing, crushing and squeezing the hybrid *Rumex Acetosa L.*,
   adding citric acid or fruit acid to the resulting squeezed juice to form floccular precipitate; and
   removing supernatants to obtain the leaf protein, wherein the female parent of the hybrid *Rumex Acetosa L.* is *Rumex patienia L.*, and its male parent is *Rumex tianschanica L.*

3. A leaf protein of hybrid *Rumex Acetosa L.* according to claim 1, wherein the leaf protein is further dried to make protein in the form of grain or powder.

4. An animal forage prepared by the method comprising the steps of:
   washing, crushing and squeezing hybrid *Rumex Acetosa L.* to form straw residue; and
   drying, crushing or pressing the straw residue to obtain the forage in the form of powder, pellet or brick, wherein the female parent of the hybrid *Rumex Acetosa L.* is *Rumex patienia L.*, and its male parent is *Rumex tianschanica L.*

5. A method of increasing nutritious ingredients in straws of agriculture crops and improving animal palatability of the straws, comprising the steps of:

washing, crushing and squeezing the hybrid *Rumex Acetosa L.*;

heating the resulting squeezed juice to 70–80° C. to form floccular precipitate;

removing supernatants; and soaking the straws in the supernatants.

6. A method of increasing nutritious ingredients in straws of agriculture crops and improving animal palatability of the straws, comprising the steps of:

washing, crushing and squeezing the hybrid *Rumex Acetosa L.*;

adding citric acid or fruit acid to the resulting squeezed juice to form a floccular precipitate;

removing supernatants; and soaking the straws in the supernatants.

* * * * *